Figure 1:
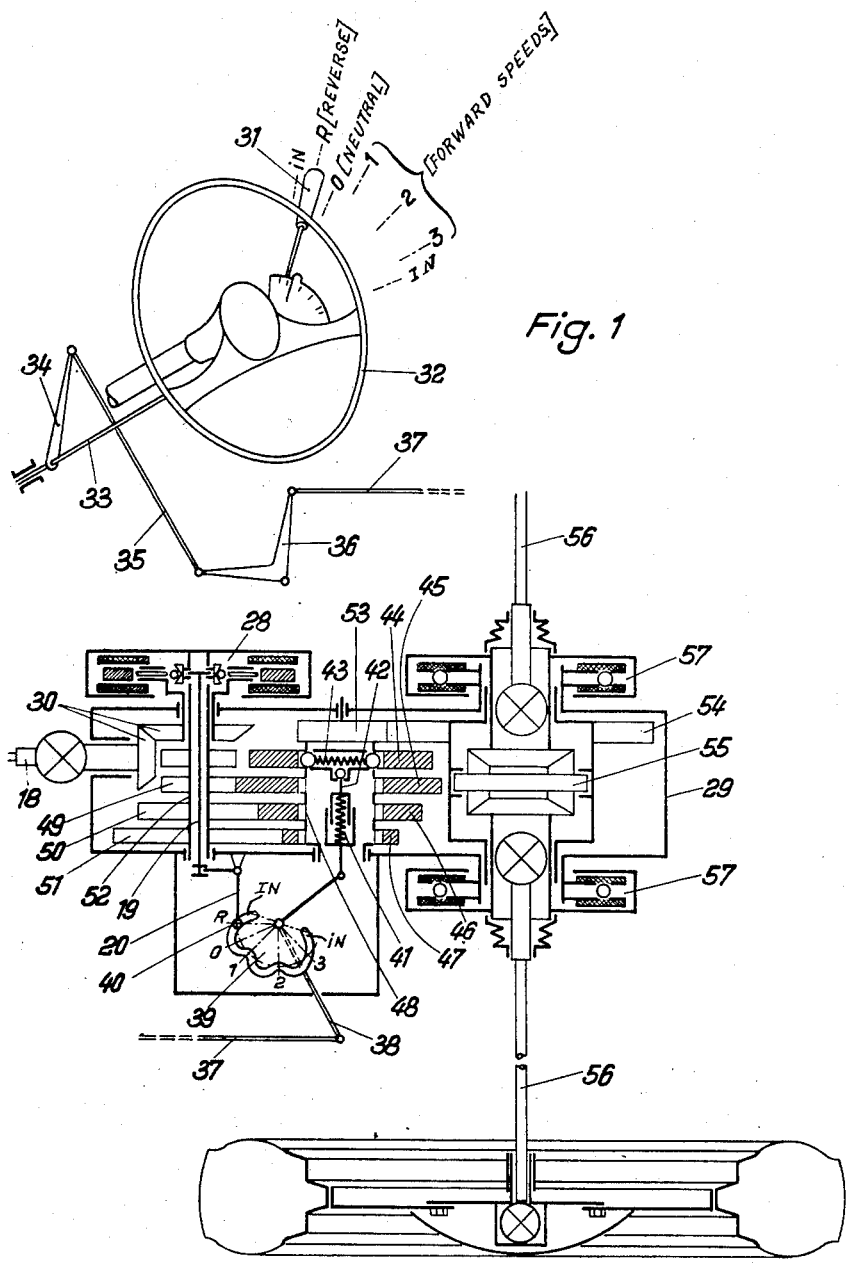

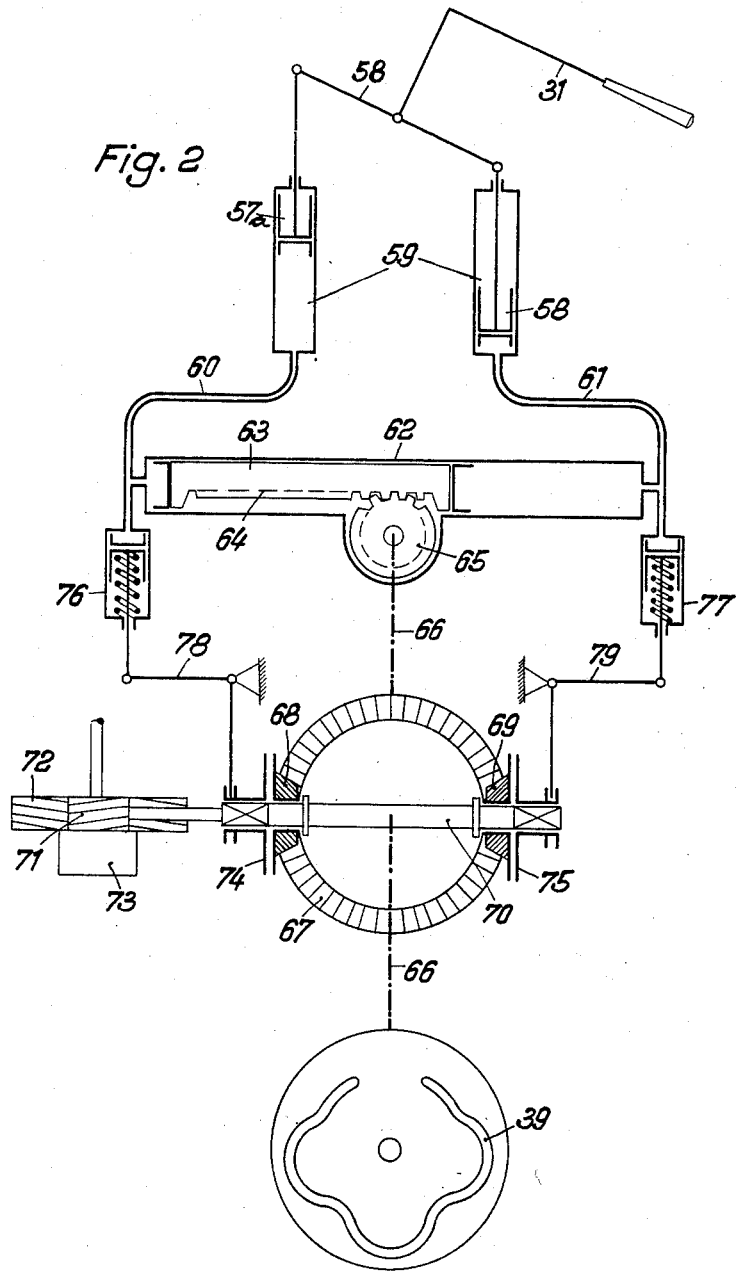

Sept. 18, 1956  H. KLAUE  2,763,350
MECHANICAL MOTOR CAR GEARING
Filed Dec. 5, 1951  5 Sheets-Sheet 3
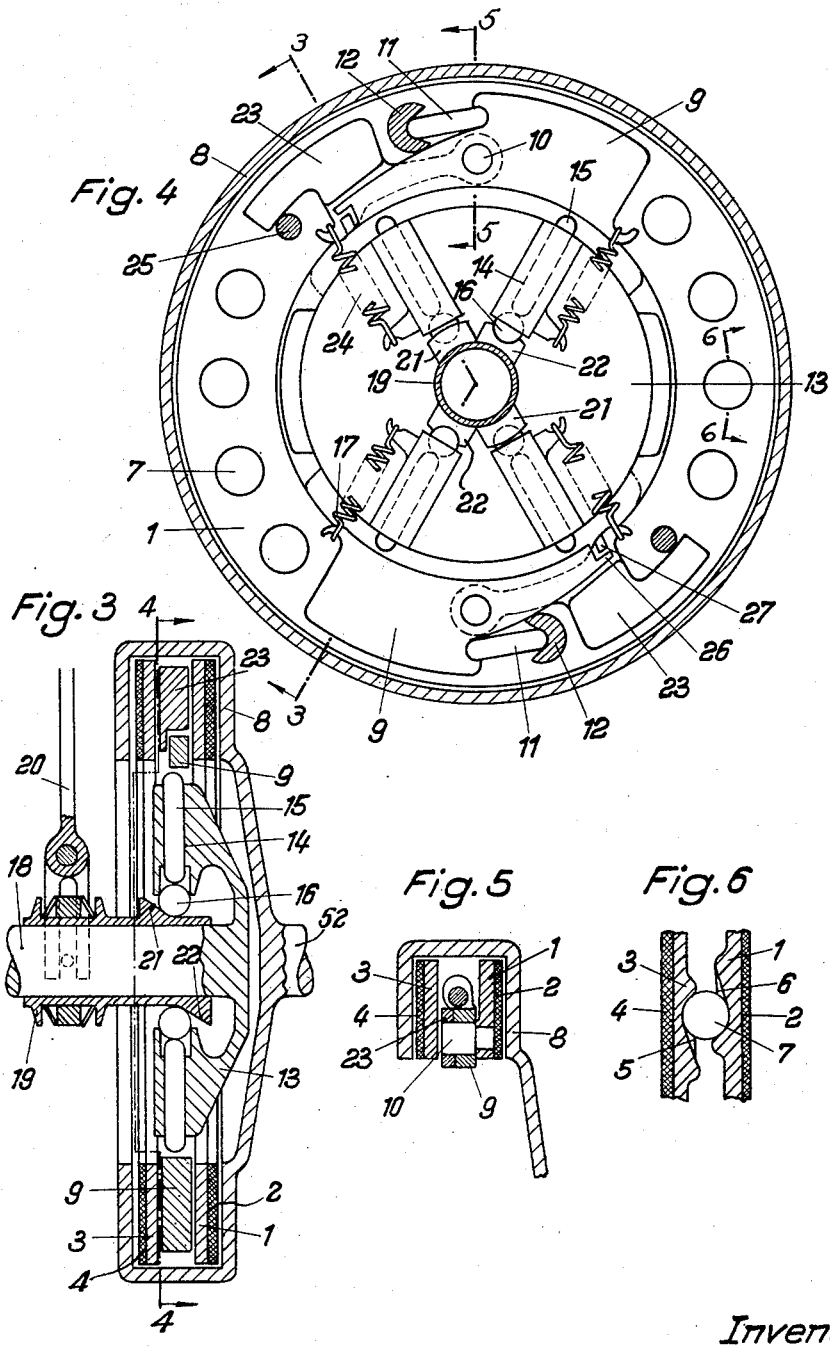
Inventor:
HERRMANN KLAUE
By E.L.Freeman
ATTORNEY

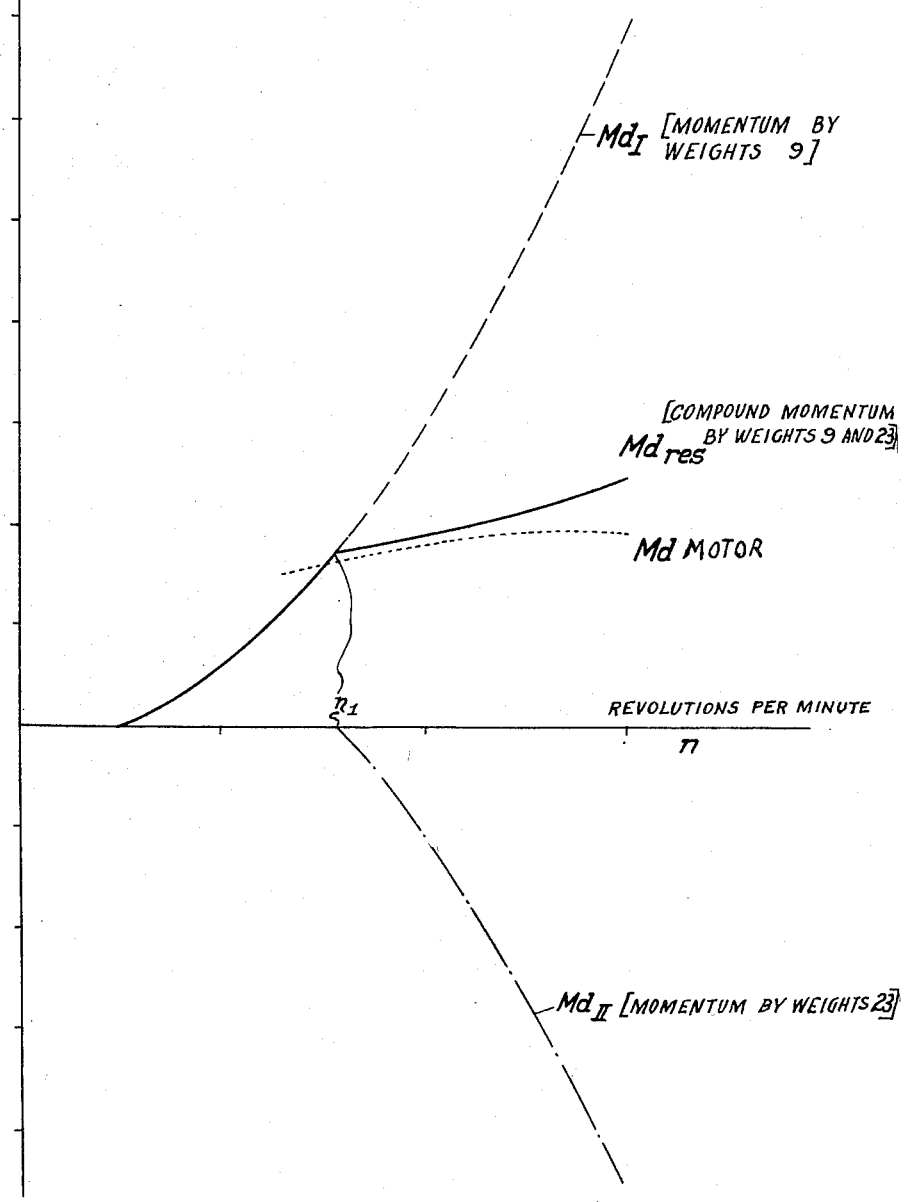

Sept. 18, 1956   H. KLAUE   2,763,350
MECHANICAL MOTOR CAR GEARING
Filed Dec. 5, 1951   5 Sheets-Sheet 5
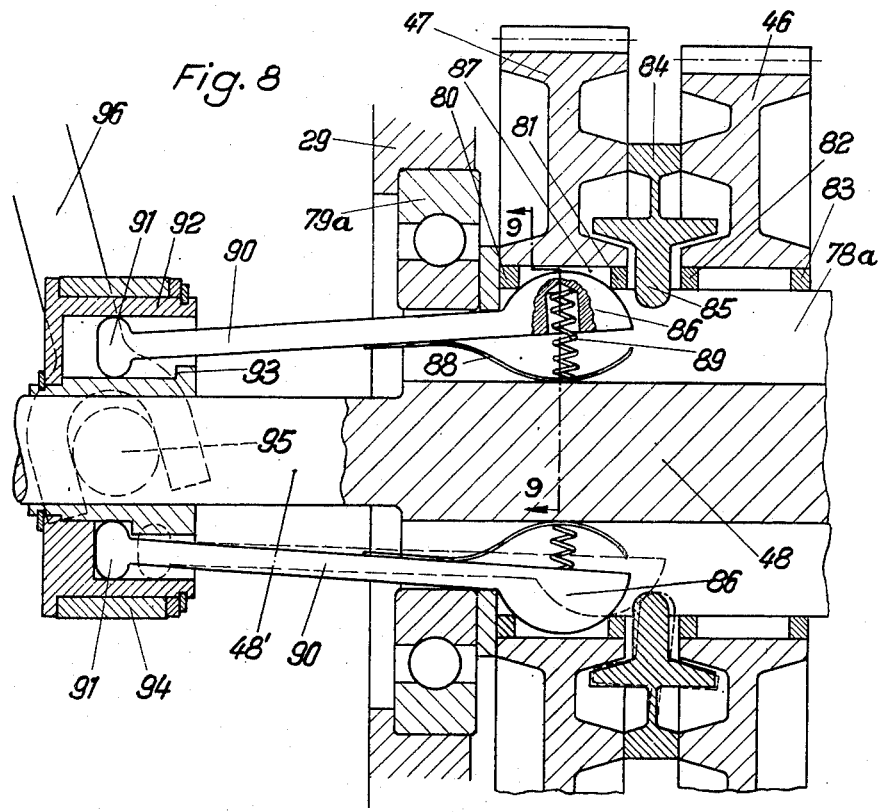
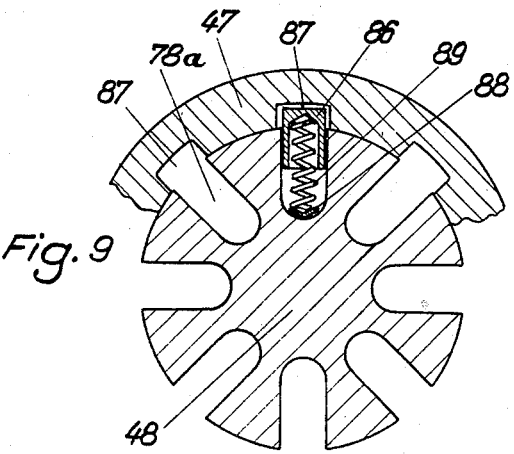
Inventor:
HERRMANN KLAUE
By E. T. Brown
ATTORNEY United States Patent Office 2,763,350
Patented Sept. 18, 1956

2,763,350
MECHANICAL MOTOR CAR GEARING
Hermann Klaue, Uberlingen, Germany
Application December 5, 1951, Serial No. 260,033
9 Claims. (Cl. 192—3.5)

The invention relates to a mechanical motor car gearing which is cheap, has a high efficiency and is adapted to be operated simply and easily.

The invention will now be described in the following with reference to the accompanying drawings.

In the drawings,

Figure 1 shows the motor car gearing with the mechanical rods belonging thereto from the actuating lever of the gearing up to the cam guide of the actuating lever of the coupling, partially in a perspective view and partially in a sectional view.

Fig. 2 is an extended elevational view of a modification that shows the substitution of these mechanical rods by a hydraulic power transmission, Fig. 3 is a sectional view, taken through the axis of the centrifugal coupling, along line 3—3 of Fig. 4, Fig. 4 is a sectional view taken through the casing of the coupling taken in a vertical direction through the axis of the coupling along line 4—4 of Fig. 3, Fig. 5 is a fragmentary sectional view taken on line 5—5 of Fig. 4, Fig. 6 is a fragmentary sectional view taken on line 6—6 of Fig. 4, Fig. 7 shows a diagram of the turning moment of the centrifugal weights, of the compensating weights, and of the engine, Fig. 8 is a longitudinal section through the gear shaft with the shifting cams shifting the toothed change wheels and their synchronizing device, and Fig. 9 is a cross sectional view, taken through the gear shaft showing the arrangement of the guiding slots for the shifting cams along line 9—9 of Fig. 8.

As the knowledge of the construction and the operation of the centrifugal coupling used in connection with the invention is required for a good understanding of the manner of operation of the motor car gearing according to the invention this coupling will be described first with respect to Figs. 3–7 of the drawings.

The coupling discs 1 and 3 are provided with a lining 2 and 4 respectively and are connected with each other by means of balls 7. The balls 7 are supported in recesses located at the inner side of the coupling discs 1 and 3. These recesses are provided with bevelled surfaces 5 and 6. The coupling case is designated with the reference numeral 8. The centrifugal weights 9 are pivotally supported at the inner side of the coupling disc 1 by bolts 10. The coupling disc 3 is provided with projections 12. Pushers 11 are provided between these projections and the centrifugal weights 9 which serve to turn the coupling discs 1 and 3 relatively to each other. Such turning of the two coupling discs takes place if the centrifugal weights 9 rock around the bolt 10 in the anticlockwise direction. The coupling discs 1 and 3 are supported by the disc carrier 13 provided with radial openings 14 serving to guide the actuating bolts 15. The disc carrier 13 is connected with the centrifugal weights 9 by springs 17. A changing sleeve 19 is displaceably supported by the shaft 18 of the engine; this shaft is solidly connected with the carrier 13 of the coupling discs. The changing sleeve is adapted to be displaced along shaft 18 of the engine by the actuating lever 20 of the coupling. The actuating sleeve 19 is provided with bevelled surfaces 21 and 22 which by balls 16 are in working connection with the actuating bolts 15.

As shown in Fig. 4 not only the centrifugal weights 9 are supported by the bolts 10 but also the compensating weights 23. The last mentioned weights are drawn by springs 24 against abutments 25 fastened at one of the coupling discs. Each centrifugal weight 9 is provided with an abutment 26 abutting against an abutment 27 if the engine runs with a certain number of rotations, said abutment 27 being located on the compensation weights.

If the shaft 18 of the engine and therewith also the carrier 13 of the coupling discs has reached a certain number of rotations the centrifugal weights 9 are rocked around the bolts 10 and against the action of the spring 17 in an anti-clockwise direction. Thereby the pushers 11 are caused to press against the projections 12 of the coupling disc 3, thereby turning the two coupling discs 1 and 3 relatively to each other. By this turning movement of the two coupling discs the coupling is connected. If disconnection is desired with a high number of rotations of the engine the actuating sleeve shown in Fig. 1 in a longitudinal section must be moved towards the right hand side by means of the actuating lever 20 of the coupling. The balls 16 then move along the bevelled surfaces 21 and press the actuating bolts 15 against the left hand end of the centrifugal weights 9. Thereby the centrifugal weights 9 are rocked around the bolts 10 in the clockwise direction so that the pressure exerted by the centrifugal weights onto the pushers 11 is discontinued. The coupling discs 1 and 3 are drawn into their disengaging position by springs not shown in the drawings.

In order to prevent that with a high number of engine rotations the actuating force for disconnecting the centrifugal coupling becomes too strong compensation weights 23 are provided. If these weights would not exist the disconnecting force would rise very considerably with an increasing number of rotations of the engine as apparent from the curve $Md_I$ (Fig. 7) shows. The action of the compensation weights 23 of which the turning moment is represented by the curve $Md_{II}$ causes a resulting turning moment $Md_{res}$ which from a certain number of rotations is in approximate conformity with the turning moment of the engine. This is important because the force for changing the centrifugal coupling is derived from the shaft 18 of the engine.

If the shaft and therewith the carrier 13 of the coupling has reached the number of rotations $n_1$ (see Fig. 7) the abutment 26 of the centrifugal weight 9 engages the abutment 27 of the compensation weight 23. Since with an increasing number of rotations the compensation weights 23 tend to rock around the bolts 10 in a clockwise direction the abutment 27 is pressed at an increasing degree against the abutment or nose 26 of the centrifugal weight 9. In consequence thereof the force required by the pusher 15 for disconnecting the coupling at a high number of rotations of the engine through rocking the centrifugal weight 9 around the bolt 10 increases at a small rate only with an increasing number of rotations.

If the coupling is to be connected while the engine is operated with a low number of revolutions the actuating sleeve 19 must be displaced on shaft 18 of the engine towards the left hand side. Then the balls 16 run up the bevelled surfaces 22 of the actuating sleeve 19 and force the bolts 15 against the centrifugal weights 9 contrary to the action of the springs 17. These centrifugal weights rock around the bolts 10 in the anticlockwise direction and press the coupling discs 1 and 3 against the case 8 of the coupling so that the coupling is engaged.

Having thus described the action of the centrifugal coupling and its operation which is independent of the number of revolutions of the engine the gearing shown in Fig. 1 will now be described. The centrifugal coupling described above is denoted in Fig. 1 with the reference numeral 28; it is arranged outside the gear case 29. In the embodiment according to Fig. 1 the carrier of the coupling discs denoted in Fig. 3 by numeral 13 is solidly connected with the shaft 18 of the engine by a pair of bevel wheels 30. The shifting device 19 which is schematically shown in Fig. 1 corresponds to the changing sleeve 19 shown in Fig. 3.

In the embodiment according to Fig. 1 the actuating lever 31 of the change gear is positioned for driving "astern." It is arranged at the steering wheel 32 and its movement is transmitted to the shifting crank 38 over the switch column 33, the levers 34 and 35, the bell crank lever 36 and the lever 37, the shifting crank 38 being solidly connected with the cam guide 39. A roller 40 slides along said cam guide, said roller being connected with the actuating lever 20 of the coupling (see Fig. 3).

A spring sleeve 41 carrying the shifting pusher 42 is connected with the shifting crank 38. The shifting piston 43 is indicated schematically. A real constructive embodiment of such piston will be fully described afterwards in connection with Figs. 8 and 9. The shifting piston 43 is displaced within the hollow shaft 48 of the gearing. In the position shown in the drawing it couples the shaft 48 of the gearing with the gear wheel 44 for "astern" running. The gear wheel for starting is designated with the numeral 45, the wheel for the second gear with 46 and the wheel for the third gear with 47. These wheels continuously mesh with the gear wheels 49, 50 and 51 respectively fastened on the hollow shaft 52. The same is true with respect to the "astern"-wheel 44. The intermediate toothed wheel connecting the toothed wheel 44 with the main shaft 52 of the gearing is not shown.

In the embodiment shown in Fig. 1 the shafts 48 and 52 extend transversely to the driving direction; the shafts may also be arranged in the driving direction. The shaft 48 of the gearing is connected with the wheel axes 56 by the toothed wheels 53 and 54 and the differential 55. On the axes 56 disc brakes 57 are fastened. These brakes as well as the centrifugal coupling 28 are arranged outside the gear case for the purpose of an improved cooling.

In the "astern" position of the actuating lever 31 of the change gear the centrifugal coupling 28 is engaged and the shaft 18 of the engine is firmly connected with the main shaft 52 of the gearing. The same is true with respect to the lever positions for the starting gear, the second and the third gear. When changing from one to another gear the roller 40 of the actuating lever 20 of the coupling runs over cams within the cam guide 39. Accordingly the centrifugal coupling 28 is each time positively disengaged. In the "In"-position of the actuating lever 31 of the change gear the actuating sleeve 19 is drawn out of the coupling 28 which thereby is disengaged.

Although the operation of coupling and uncoupling of the engine is made, with the gearing described above, essentially by the engine, with gearings for greater vehicles, especially for vehicles having the gearing at the stern, the operating work must be diminished still further to allow an easy operation.

In Fig. 2 a manner of operating the gearing system is illustrated according to which the changing lever of the gearing designated in Fig. 1 with the numeral 31 couples the shaft of the engine with the changing shaft of the gearing during the changing procedure. The positive connection between the shaft of the engine and the changing shaft of the gearing is made by insertion of a suitable transmission gear over anr axle drive bevel wheel solidly coupled with the changing shaft of the gearing, and one of two bevel wheels which are alternately solidly connected with the shaft of the engine by one of the two couplings actuated from the changing lever of the gearing, in conformity with the direction towards which the vehicle is steered.

The changing lever 31 of the gearing actuates the hydraulic pistons 57a and 58 of the hydrualic shifting device 59 by means of a double-armed lever 58. The said shifting device 59 is connected with the double-acting cylinder 62 by pipes 60 and 61, said working cylinder being provided at both ends with admission openings. The piston 63 of the working cylinder actuates the changing shaft 66 by means of a rock 64 connected with the piston and a toothed wheel 65 attached to said changing shaft. The latter connects the toothed wheel 65 on the one hand with the changing or shifting crank (not shown) for changing the gears and, on the other hand, with the cam guide 39 for actuating the centrifugal coupling 28, and finally also with the axle drive bevel wheel 67. The latter meshes with two bevel wheels 68 and 69 supported by a shaft 70 connected with the shaft 73 of the engine by a pair of screw wheels 71, 72. The bevel wheels 68 and 69 may be connected with the shaft 70 and thereby with the driving engine by couplings 74 and 75 respectively. The said couplings are actuated by hydraulic cylinders 76, 77 over bell crank levers 78 and 79. The hydraulic cylinders are each connected with one end of the working cylinder 62.

The described device is operated, as follows: If the changing lever 31 is moved the piston 57a or 58 will cause an increase of the pressure in the respective cylinder of the shifting device 59, corresponding to the direction of movement of the changing lever. The pressure is transmitted through the pipes 60 or 61 to the respective side of the working cylinder 62 thereby causing the piston 63 to turn the changing shaft 66 by means of the rock 64 and the toothed wheel 65 in the clockwise or anticlockwise direction. At the same time with piston 63 the piston of the hydraulic cylinder 76 or 77 is moved and thereby the coupling 74 or 75, as the case may be, is engaged over the bell crank lever 78 or 79 respectively. By the actuation of the coupling a solid connection is created of the shaft 73 of the engine with one of the bevel gears 68 or 69. Then the changing shaft 66 of the gearing is turned in the required direction over the axle drive bevel wheel 67 by the force of the engine.

The operation of the gearing as described above has the advantage of a very simple and cheap construction. In contradistinction to the servo-changing devices known up to now which act by means of compressed air or suction from the engine or by oil pressure with a separate pump, here the gear change speed is influenced by the driver when actuating the gear so that a fully smooth change of the mechanical motor car gear with automatically shifting coupling is warranted.

In Figs. 8 and 9 an embodiment of the changing device 42, 43 is shown which is only schematically indicated in Fig. 1 and which serves as gear changing organ and as synchronizing organ for the gear wheels. The changing device according to the invention is characterized therein that the device for coupling the gear wheels with the shaft of the gearing and for pressing the brake ring serving for synchronizing purposes against the toothed wheel to be shifted consists of changing cams guided in radial slots of the shaft of the gearing and resiliently supported by them, each of said cams being connected with a changing pusher projecting from the shaft of the gearing in the longitudinal direction. The changing pushers are guided in a common changing sleeve supported by, and axially displaceable relatively to, a projection of the shaft of the gearing. One half of the cams or pushers is staggered relatively to the other half in the changing direction so that the brake ring is pressed against the toothed wheel to be coupled with the shaft of the gearing before such coupling is effected.

In Figs. 8 and 9 the shaft 48 of the gearing is not hollow as in Fig. 1 but is a solid shaft provided with radial guiding slots 78a and is supported in the gear case 29 by means of ball bearings 79a. For the purpose of a clearer illustration only two toothed gear wheels 46 and 47 are shown. The toothed wheels 47 and 46 are rotably supported by the shaft 48 of the gearing, bearing rings 80 and 81 or 82 and 83 being inserted between said wheels and shaft respectively. The toothed wheels 46 and 47 may be coupled with the shaft 48. Between the toothed wheels 46 and 47 the brake ring 84 is provided serving for synchronizing the toothed gear wheels and suspended so that it may yieldingly move in the axial direction. The said ring is provided with teeth 85 engaging slots 78a of the shaft 48. The brake ring 84 and the flanks of the toothed gear wheels are provided with coupling faces shaped in such a manner that a pressure exerted on the teeth 85 of the brake ring causes the coupling of two neighbouring toothed gear wheels. This is indicated in Fig. 8 in dash lines.

Fig. 9 shows that the shaft 48 of the gearing is coupled with the toothed wheels, e. g. with the toothed wheel 47, in such a manner that yielding cams 86 project from slots 78a of the shaft 48 of the gearing into grooves 87 of the toothed wheels. Slide bars 88 cooperate with to said changing cams 86, said bars resting on the bottom of the slots 87, and springs 89 are inserted between the cams and slide bars. The changing cams coact with changing pushers 90 ending in annular beads 91. These annular beads are supported by a sleeve 92 displaceably supported on an extension 48' of the shaft 48 of the gearing, said extension having a smaller diameter than the shaft. By means of this changing sleeve the cams 86 and the changing pushers 90 are pushed into the slots 78a of the shaft 48 of the gearing.

The cross section of the changing sleeve 92 shown in Fig. 8 illustrates that the upper changing pusher 90 has a play while the lower changing pusher is supported without play. The upper pusher with the changing cam 86 serves only for coupling the shaft 48 of the gearing with one of the toothed wheels of the gearing. When changing from the toothed wheel 47 to the toothed wheel 46 the changing sleeve 92 is to be moved towards the right. The lower shifting or changing cam serves to press the brake ring 84 against the toothed wheel to be shifted and to cause, in this way, a synchronization. If, e. g. the upper cam 86 is brought from the position in which the toothed wheel 46 is coupled with the shaft 48 of the gearing to the position in which the toothed wheel 47 is coupled with the shaft 48 the changing sleeve 92 must be displaced towards the left. The upper changing cam is not driven before its bead 91 abuts against the right hand projection 93 of the changing sleeve 92. This means that also during the return movement the lower cam leads causing synchronization. In the embodiment shown in the drawings four changing cams are provided for coupling the toothed wheels of the gearing with the shaft of the gearing and four changing cams for pressing the brake ring 84 against the wheel to be shifted. The changing sleeve 92 is displaced on the projection 48' of the shaft 48 of the gearing by means of the lever 96 coupled with the changing crank 38. The fork of this lever engages bolts 95 provided at opposite sides of the changing ring 94. The changing sleeve 92 rotates with the shaft 48. The changing ring 94 is slidably supported by the changing sleeve 92.

In Figs. 8 and 9 one suitable embodiment of the changing device of the gearing is illustrated. It is of no importance in what manner the changing device is operated. It is only essential that a certain coupling position of one of the gear wheels with the shaft 48 of the gearing corresponds to every position of the gear changing lever 31. By the invention described with respect to Figs. 1–9 a motor car gearing is created in which an actuation of the coupling pedal before each changing of the gear is dispensed with.

Having thus particularly described the nature of my said invention and the manner in what the same is to be performed what I wish to have covered by Letters Patent is:

1. A mechanical motor car gearing comprising in combination, an engine, a shaft driven by said engine, a main shaft of the gearing, a centrifugal coupling inserted between said engine shaft and said main shaft, said coupling being adapted to connect releasably the engine automatically with the gearing after the engine has attained a certain number of revolutions, changing means comprising means cooperating with said gearing and including a changing lever, said changing means adapted to be actuated by said lever so as to disconnect the engine from the gearing before every gear changing, said changing means including a cam guide adapted to act upon the centrifugal coupling in timed relationship with respect to the gear changing, and including a plurality of gears, a synchronizing brake ring suspended between adjoining pairs of said gears, said gears being operable to be coupled with said main gearing shaft and uncoupled from it, and means adapted to press said braking ring against the gear to be coupled, and operable for coupling each gear with said shaft.

2. A mechanical motor car gearing as claimed in claim 1, the side faces of said brake ring and the flanks of the said gears being formed so as to be able to firmly engage each other.

3. A mechanical motor car gearing as claimed in claim 1, said last-named means comprising cams guided in radial slots provided in the said shaft of the gearing, springs acting between said cams and said shaft of the gearing, pushers connected with said cams and projecting from said slots and means adapted to actuate said pushers.

4. A motor car gearing comprising in combination an engine, a hollow main shaft driven by said engine, an engine shaft, a centrifugal coupling inserted between said engine shaft and said main shaft, said coupling being adapted to connect releasably the engine automatically with the gearing after the engine has attained a certain predetermined number of revolutions, changing means comprising means cooperating with said gearing and including a changing lever, said changing means adapted to be actuated by said lever so as to disconnect the engine from the gearing before each gear changing, said changing means including a cam guide adapted to act upon the centrifugal coupling in timed relationship with the gear changing, a case enclosing said car gearing, a further case enclosing said centrifugal coupling pivotally connected to said first mentioned casing and rigidly connected with said hollow main shaft.

5. In a motor car gearing as claimed in claim 4, said centrifugal coupling comprising two coupling discs arranged axially displaceably and rotatably relatively to each other and provided at their inner surface with recesses having a bevelled running-up surface and balls inserted into said recesses and being adapted to frictionally couple said coupling discs, when the latter are rotated relatively to each other by running-up along said bevelled running-up surface.

6. In a motor car gearing as claimed in claim 4, said centrifugal coupling comprising two coupling discs arranged axially displaceably and rotatably relatively to each other and provided at their inner surfaces with recesses having a bevelled running-up surface, balls inserted into said recesses and being adapted to frictionally couple said coupling discs when the latter are rotated relatively to each other by running-up said bevelled surface, centrifugal weights pivotally connected to one of said coupling discs and adapted to rotate the same automatically relatively to each other by running-up said bevelled surface, centrifugal weights pivotally connected to one of said coupling discs and adapted to rotate the same automatically relatively to each other, means comprising a changing sleeve supported by said motor shaft so as to be axially displaceable, changing bolts controlled by said changing sleeve and springs acting on said bolts.

7. A motor car gearing as claimed in claim 4, said centrifugal coupling comprising two coupling discs arranged axially displaceably and rotatably relatively to each other and provided at their inner surfaces with recesses having a bevelled running-up surface, balls inserted into said recesses and being adapted to positively couple said coupling discs when the latter are rotated relatively to each other, by running-up along said bevelled surface, centrifugal weights, pivotally connected with said coupling discs and adapted to rotate said coupling discs automatically relatively to each other and said shiftable means comprising a changing sleeve supported by said motor shaft so as to be axially displaceable and provided with bevelled surfaces, changing bolts controlled by said bevelled surfaces of the changing sleeve, springs acting against said bolts, a changing lever actuating said changing sleeve and a cam guide controlling said lever in timed relationship to the gear change.

8. A motor car gearing as claimed in claim 4, said centrifugal coupling comprising two coupling discs arranged axially displaceably and rotatably relatively to each other and provided at their inner surfaces with recesses having a bevelled running-up surface, balls inserted into said recesses and being adapted to positively couple said coupling discs when the latter are rotated relatively to each other, by running-up along said bevelled surface, centrifugal weights, pivotally connected to one of said coupling discs and adapted to rotate said coupling discs automatically relatively to each other and said shiftable means comprising a changing sleeve supported by said motor shaft so as to be axially displaceable, changing bolts controlled by said changing sleeve, springs, acting against said bolts, adapted to move said centrifugal weights into the engaging and disengaging position and compensation weights also pivotally connected to one of said coupling discs, said centrifugal weights and compensation weights being provided with abutments adapted to engage each other.

9. A motor gearing as claimed in claim 4, said centrifugal coupling comprising two coupling discs arranged axially displaceably and rotatably relatively to each other and provided at their inner surfaces with recesses having a bevelled running-up surface, balls inserted into said recesses and being adapted to positively couple said coupling discs when the latter are rotated relatively to each other, by running-up along said bevelled surface, centrifugal weights, pivotally connected to one of said coupling discs and adapted to rotate said coupling discs automatically relatively to each other and said shiftable means comprising a changing sleeve supported by said motor shaft so as to be axially displaceable, changing bolts controlled by said changing sleeve, springs acting against said bolts, compensation weights pivotally connected to one of said coupling discs, said centrifugal weights and compensation weights being provided with abutments adapted to engage each other from a certain number of revolutions forth and return springs keeping the said compensation weight in their position of rest, said compensation weight being dimensioned and arranged so that the course of their turning moment counteracts the course of the turning moment of the centrifugal weights from a certain number of revolutions forth.

References Cited in the file of this patent

UNITED STATES PATENTS

| | | |
|---|---|---|
| 905,637 | Beskow | Dec. 1, 1908 |
| 1,273,266 | Patch | July 23, 1918 |
| 1,693,645 | Fahrney | Dec. 4, 1928 |
| 1,861,776 | Barth | June 7, 1932 |
| 2,153,509 | Rockwell | Apr. 4, 1939 |
| 2,635,722 | Wemp | Apr. 21, 1953 |